United States Patent [19]

Sakamoto et al.

[11] Patent Number: 5,097,279
[45] Date of Patent: Mar. 17, 1992

[54] CAMERA CAPABLE OF TRIMMING PHOTOGRAPHING

[75] Inventors: Hiroshi Sakamoto, Kawasaki; Kazuyuki Kazami, Tokyo, both of Japan

[73] Assignee: Nikon Corporation, Tokyo, Japan

[21] Appl. No.: 598,743

[22] Filed: Oct. 16, 1990

Related U.S. Application Data

[63] Continuation of Ser. No. 453,712, Dec. 25, 1989, abandoned.

[30] Foreign Application Priority Data

Dec. 23, 1988 [JP] Japan ................. 63-326920

[51] Int. Cl.$^5$ .................. G03B 17/24; G03B 5/00
[52] U.S. Cl. ............................ 354/106; 354/195.1
[58] Field of Search ........... 354/159, 105, 106, 195.1, 354/195.12, 410

[56] References Cited

U.S. PATENT DOCUMENTS

| | | | |
|---|---|---|---|
| 4,652,104 | 3/1987 | Harvey | 354/106 |
| 4,731,629 | 3/1988 | Aoshima et al. | 354/410 |
| 4,774,536 | 9/1988 | Inoue et al. | 354/106 |
| 4,896,179 | 1/1990 | Watanabe | 354/195.1 |
| 4,942,417 | 7/1990 | Miyazawa et al. | 354/195.1 X |

*Primary Examiner*—Russell E. Adams
*Assistant Examiner*—Jae N. Noh
*Attorney, Agent, or Firm*—Shapiro and Shapiro

[57] ABSTRACT

A camera capable of trimming photographing comprises a driving device for electrically driving a zoom lens on the basis of a received signal for zooming and varying the focal length thereof, a setting device for setting one of a plurality of presettable trimming magnifications on the basis of a received signal for changing magnification, a recording device for recording information regarding the set trimming magnification on a recording medium, and an operating device capable of performing a first operation and a second operation subsequent to and in the same direction as the first operation, and producing the signal for zooming in response to the first operation and the signal for changing magnification in response to the second operation.

6 Claims, 11 Drawing Sheets

CAMERA CAPABLE OF TRIMMING PHOTOGRAPHING

This is a continuation of application Ser. No. 453,712 filed Dec. 20, 1989, now abandoned.

BACKGROUND OF THE INVENTION

1. Field of the Invention

This invention relates to a camera provided with a zoom lens and capable of trimming photographing.

2. Related Background Art

There is known so-called pseudo-zooming in which not the whole but a part of an exposed area corresponding to one frame of photographed film is enlarged and printed on photographic paper, whereby a photograph similar to a photograph by ordinary zooming is obtained.

To obtain a photograph by the pseudo-zooming of this kind, in order to designate the area of the exposed area corresponding to one frame of film which is to be printed, it is necessary that information called trimming magnification representative of that area be recorded on a recording area (for example, the recording portion of a film cartridge) corresponding to each frame of the film in response to shutter release. This recorded trimming magnification is detected on the printing device side during printing, and the print of the designated area is output on the basis of the result of the detection. Photographing in which trimming magnification is thus recorded on a recording area during shutter release is called trimming photographing.

There has also been proposed a camera having a zoom lens and capable of the above-described trimming photographing only when the zoom lens is at the telephoto end. That is, in the camera of this kind, ordinary zooming is effected in the zooming range of the zoom lens and trimming photographing is effected when the zoom lens is at the telephoto end, whereby there is obtained a print smaller in angle of view than when photographing is effected at the telephoto end. The trimming magnification at that time is designed to be selected from among trimming magnifications which are presettable.

In the prior-art camera described above, however, an operating member for selecting this trimming magnification and an operating member for effecting ordinary zooming are individually provided and this leads to the problem of bad operability.

SUMMARY OF THE INVENTION

It is an object of the present invention to provide a camera in which selection of ordinary zooming and trimming magnification can be accomplished by a single operating member.

Figure 1A:
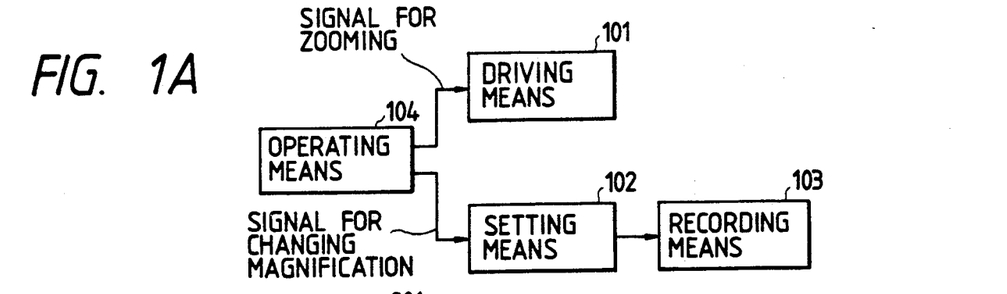
FIGS. 1A and 1B correspond to the appended claims.

Describing the invention with reference to FIG. 1A of the accompanying drawings which corresponds to the appended claims, the invention of Claim 1 is applied to a camera provided with driving means 101 for electrically driving a zoom lens on the basis of a received signal for zooming and varying the focal length thereof, setting means 102 for setting one of a plurality of presettable trimming magnifications on the basis of a received signal for changing magnification, and recording means 103 for recording information regarding said set trimming magnification on a recording medium. The camera is further provided with operating means 104 capable of performing a first operation and a second operation subsequent to and in the same direction as said first operation and producing the signal for zooming in response to said first operation and the signal for changing magnification in response to said second operation, thereby solving the above-described technical task.

Figure 1B:
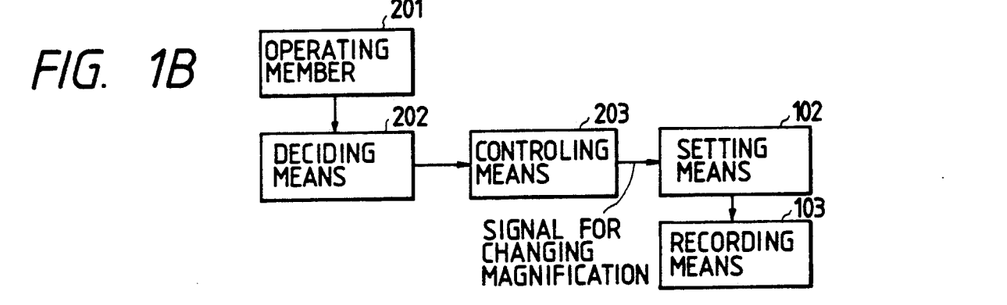

Describing the invention with reference to FIG. 1B of the accompanying drawings which corresponds to the appended claims, the invention of Claim 2 is applied to a camera provided with said setting means 102 and said recording means 103 and capable of photographing by a zoom lens whose focal length varies in conformity with the amount of operation of an operating member 201. The camera is further provided with deciding means 202 for receiving a signal conforming to the operational speed of the operating member 201 and judging on the basis of that signal whether the velocity of operation is above a predetermined value, and controlling means 203 for outputting a signal for changing magnification to said setting means 102 when it is judged by said deciding means 202 that the velocity of operation is above a preset value, and changing the trimming magnification set in said setting means 102, thereby solving the above-described technical task.

By the construction according to the above-described invention of Claim 1, the operating means 104 produces a signal for zooming in response to a first operation. With this signal for zooming, the driving means 101 electrically drives the zoom lens and varies the focal length thereof. Also, the operating means 104 produces a signal for changing magnification in response to a second operation subsequent to and in the same direction as said first operation. With this signal for changing magnification, the setting means 102 sets one of a plurality of presettable trimming magnifications.

By the construction according to the above-described invention of Claim 2, the deciding means 202 receives a signal conforming to the velocity of operation of the operating member 201 for zooming, and judges on the basis of that signal whether the operational speed is above a predetermined value. The controlling means 203 outputs a signal for changing magnification to the setting means 102 when it is judged by the deciding means 202 that said velocity of operation is above said predetermined value, and changes the trimming magnification set in the setting means 102.

Further objects, features and advantages of the present invention will become apparent from the following description of preferred embodiments of the present invention taken in conjunction with the accompanying drawings.

BRIEF DESCRIPTION OF THE DRAWINGS

FIGS. 2 to 11 show a first embodiment of the present invention, FIG. 2A being a front view of a camera, FIG. 2B showing the construction of a zooming button, FIG. 3 being a block diagram of a control system, FIG. 4 showing the relation among the focal length of a taking lens, trimming magnification and equivalent focal length, FIGS. 5-10 being flow charts showing the procedure of control, and FIG. 11 showing an example of the variation in the equivalent focal length when a switch knob is second-operated.

DESCRIPTION OF THE PREFERRED EMBODIMENTS

First Embodiment

A first embodiment of the present invention will hereinafter be described with reference to FIGS. 2 to 11.

Figure 2A:
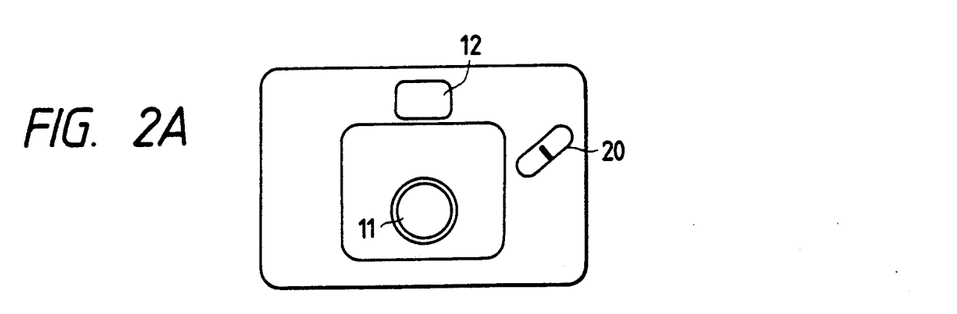
Figure 2B:
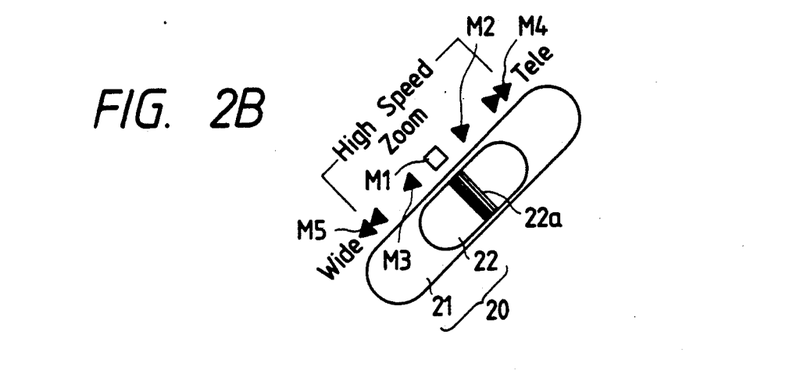

Referring to FIG. 2A which is a front view of a camera, a taking lens (zoom lens) 11, a viewfinder window 12 and a zooming operating portion 20 are provided in the front face of the camera body. The zooming operating portion 20, as shown in FIG. 2B, has a switch knob 22 slidingly operable in a slot 21, and an index mark 22a is provided on the switch knob 22. Marks M1-M5 are provided near the slot 21, and the switch knob 22, when not operated, is held in its original position wherein the index mark 22a points to the mark M1, as shown, by a return mechanism, not shown.

Also, the switch knob 22 permits a first operation in the telephoto direction or the wide angle direction by which the switch knob is slidden to a position in which the index mark 22a points to the mark M2 or M3, and a second operation in the telephoto direction or the wide angle direction by which the switch knob is slidden to a position in which the index mark 22a points to the mark M4 or M5, and the switch knob 22 is designed such that when the second operation in the same direction as the first operation is to be performed from the first operation position, an operating force greater than when the first operation is performed from the original position is required. Accordingly, the operator can distinctively perform the first and second operations even without visually confirming the operating portion 20.

Figure 3:
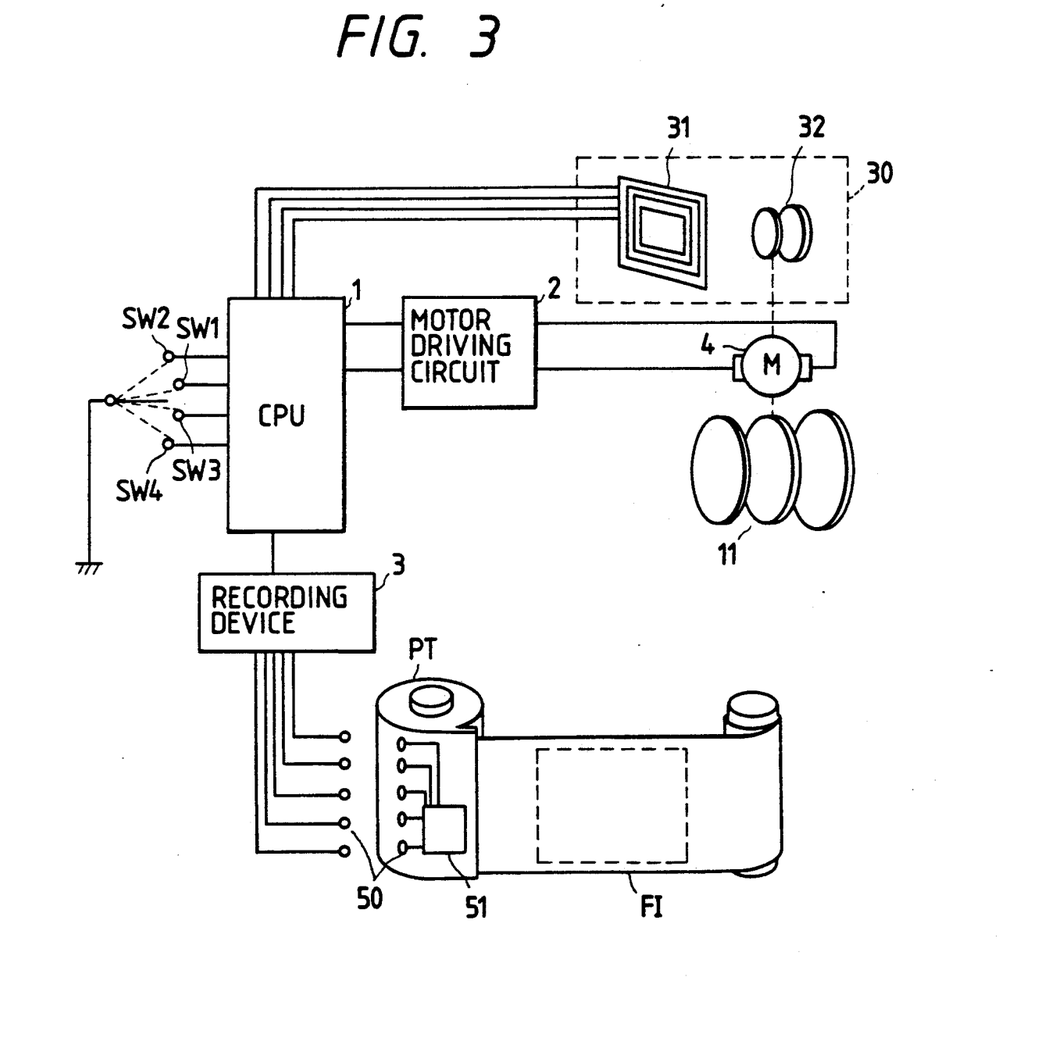

Referring to FIG. 3 which is a block diagram of a control system, a CPU 1 has connected thereto switches SW1-SW4, a motor driving circuit 2, a recording device 3 and the field frame 31 of a viewfinder 30. The switches SW1-SW4 are switches adapted to be closed in response to the operation of the above-described switch knob 22, and the switches SW1 and SW2 are closed by the first operation of the switch knob 22 in the telephoto direction and the second operation of the switch knob 22 in the telephoto direction, respectively, and the switches SW3 and SW4 are closed by the first operation of the switch knob 22 in the wide angle direction and the second operation of the switch knob 22 in the wide angle direction, respectively. With the closing of the switch SW1, a zoom up signal is output, and with the closing of the switch SW3, a zoom down signal is output, and with the closing of the switches SW2 and SW4, a signal for changing magnification is output. The zoom up signal and zoom down signal are signals for zooming.

A zooming motor 4 is connected to the motor driving circuit 2, and drives a taking lens 11 with the signal for zooming from the CPU 1 and varies the focal length thereof and also, zooming-drives the viewfinder optical system 32 of the viewfinder 30 and varies the angle of view thereof so as to correspond to the focal length of the taking lens 11.

Here, the taking lens 11 is, for example, a zoom lens whose focal length is variable within the range of 35 mm-100 mm, and the CPU 1 outputs to the motor driving circuit 2 a command for varying the focal length of the taking lens 11 to the telephoto side or the wide angle side, with the closing of the switch SW1 or SW3, i.e., the outputting of the zoom up signal or the zoom down signal.

Also, in the camera of the present embodiment, the trimming magnification can be set to one of 1.00, 1.26, 1.59 and 2.00. The trimming magnification is information indicative of what portion from the center of the exposed area of film FI obtained by shutter release should be printed, and one of the aforementioned trimming magnifications is set by the CPU 1. When this trimming magnification is "1.00", trimming is not effected, but the entire exposed area becomes the object of printing. If as will be described later, the switch SW1 or SW3 is closed when the taking lens 11 is at the telephoto end (when the focal length is 100 mm), this trimming magnification is changed. Also, if the switch SW2 or SW4 is closed irrespective of the focal length of the taking lens 11, that is, if the signal for changing magnification is output, the trimming magnification is changed.

Figure 4:
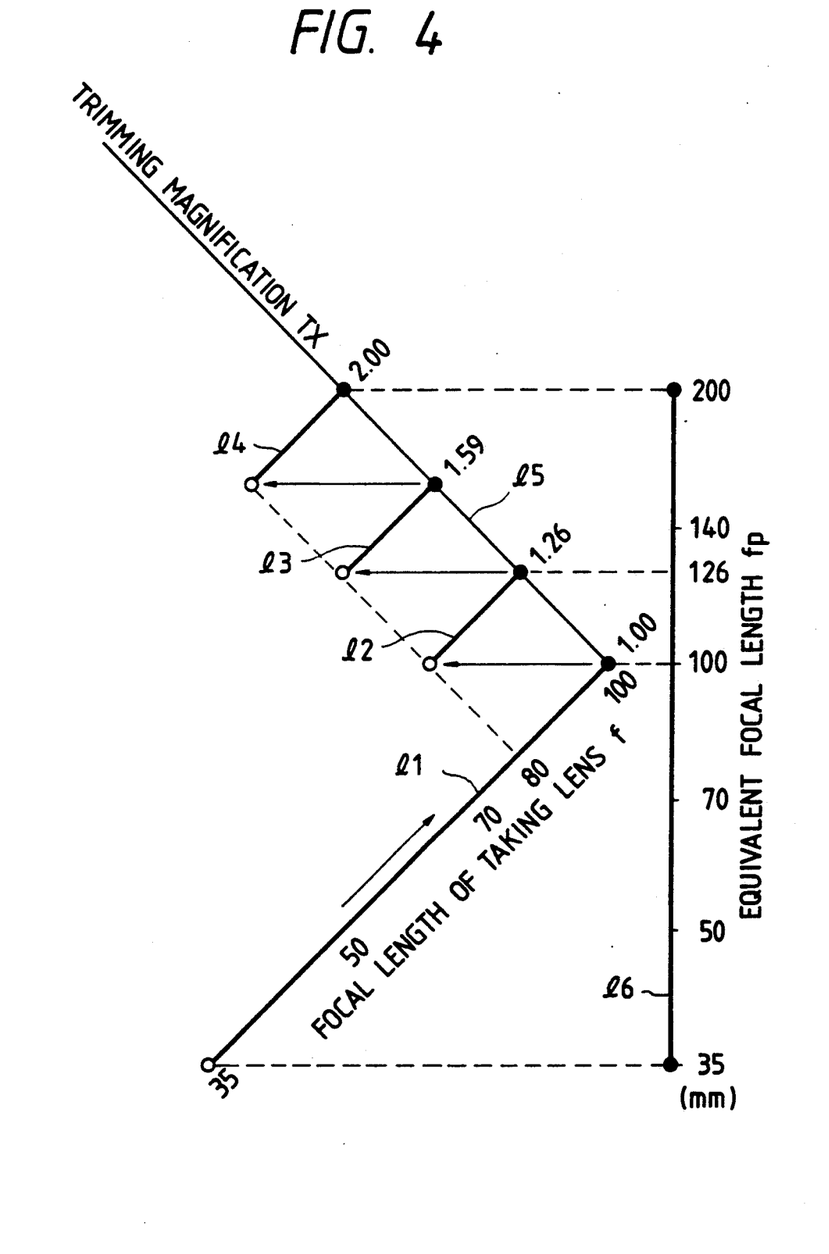

FIG. 4 shows the focal length f of the taking lens 11, the trimming magnification TX and the equivalent focal length fp determined by the values of these. In FIG. 4, lines l1-l4 indicate variations in the focal length f, line l5 indicates a variation in the trimming magnification TX, and line l6 indicates the equivalent focal length fp. This equivalent focal length fp is a value corresponding to the angle of view of an image printed and visualized, and is represented by the product of the focal length f of the taking lens 11 and the trimming magnification TX. For example, when fp=140 mm, there is obtained a print of the same angle of view as that when photographing is effected by a taking lens whose focal length f is 140 mm.

The CPU 1 changes the field frame 31 within the viewfinder 30 with a change in the above-described trimming magnification TX. The field frame 31 comprises, for example, a liquid crystal element, and as shown in FIG. 3, four large and small field frames are provided to represent angles of view corresponding to the abovementioned four trimming magnifications TX. The greater is the trimming magnification TX, the smaller is made the field frame 31. The CPU 1 displays a predetermined field frame 31 within the viewfinder 30 with a change in the trimming magnification TX, and varies the viewfinder 30 to an angle of view corresponding to that trimming magnification TX. By a combination of the aforementioned viewfinder optical system 32 and these field frames 31, a picture plane always corresponding to the equivalent focal length fp is obtained in the viewfinder 30.

The recording device 3 (FIG. 3) is adapted to be connected to an information recording portion 51 on the cardridge PT side through a contact 50 during the insertion of the cartridge PT, and for example, with shutter release, it records information indicative of the set trimming magnification TX for each frame in the information recording portion 51. This recorded trimming magnification TX is detected on the printer side during printing, and there is obtained a print of the area designated on the result of the detection.

The procedure of the control by the CPU 1 will now be described with reference to the programs of FIGS. 5-10.

Figure 5:
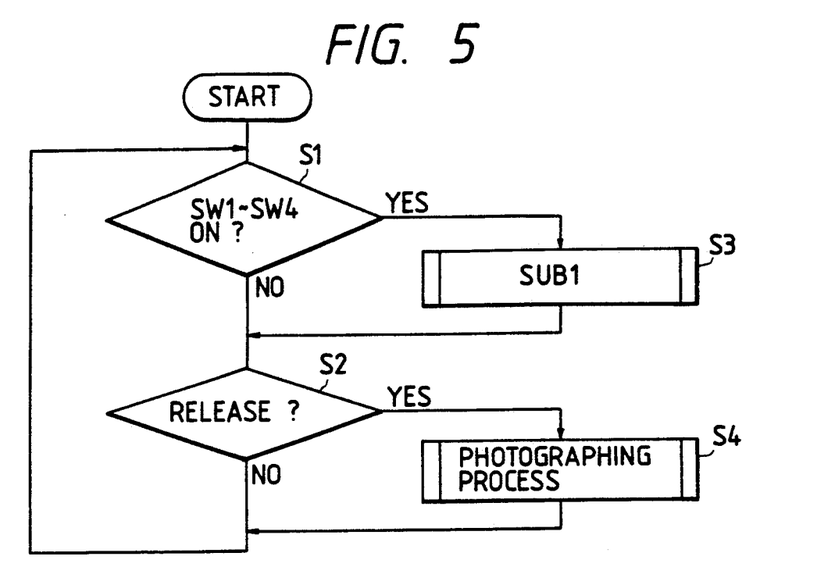

When for example, the power source of the camera is switched on, the program of FIG. 5 is started, and first at step S1, whether one of the afore-described switches SW1-SW4 has been closed is judged. If the step S1 is negated, at step S2, whether a release switch, not shown, is ON is judged, and if the step S2 is negated, return is made to the step S1. If the step S2 is affirmed, at step S4, the shutter release process is carried out and return is made to the step S1, where the above-described process is repeated. During this shutter release, the trimming magnification TX is recorded in the information recording portion 51 of the cartridge PT by the recording device 3.

Figure 6:
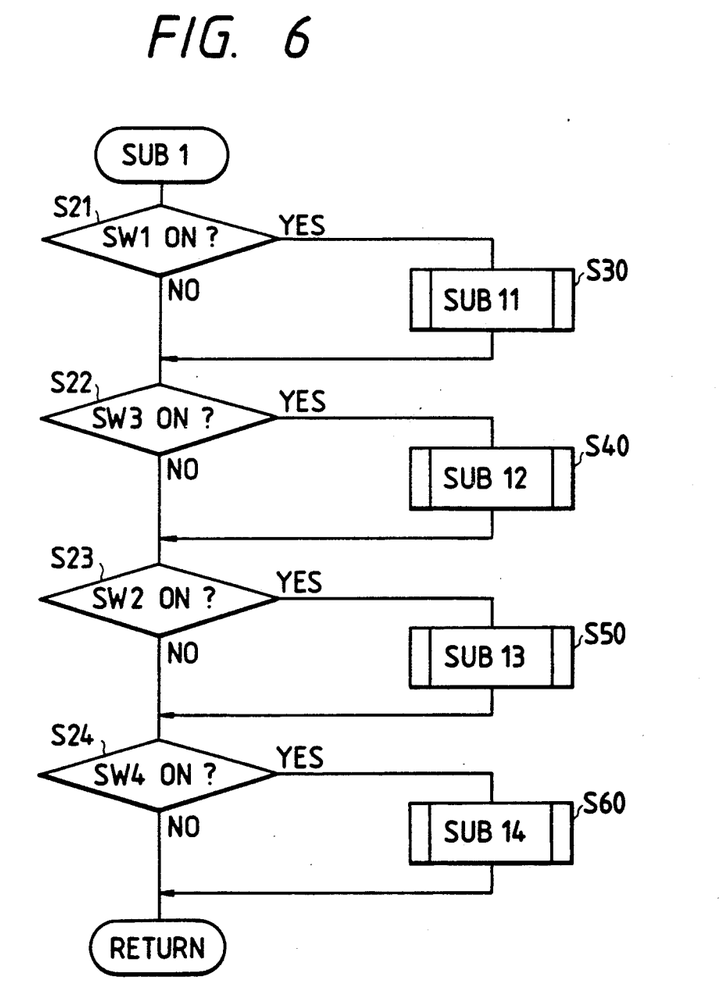

If the step S1 is affirmed, at step S3, shift is made to a subroutine SUB 1 (FIG. 6). In FIG. 6, at steps S21-S24, which of the switches SW1-SW4 has been closed is first judged. If at the step S1, it is judged that the switch SW1 is ON, that is, it is judged that the switch knob 22 has been first-operated to the telephoto side, at step S30, shift is made to the subroutine SUB 11 of FIG. 7, and at step S31, whether the taking lens 11 is at the telephoto end, that is, whether the current focal length f of the taking lens 11 is 100 mm, is judged. If the step S31 is negated, at step S32, the taking lens 11 is driven by the motor 4 through the motor driving circuit 2, whereby the focal length f thereof is varied to the telephoto side, and advance is made to step S33. That is, zoom up is effected. At the step S33, whether the switch SW1 is still ON is judged, and if the switch SW1 is ON, return is made to the step S31, and if the switch SW1 is OFF, return is made to the process of FIG. 6.

Figure 7:
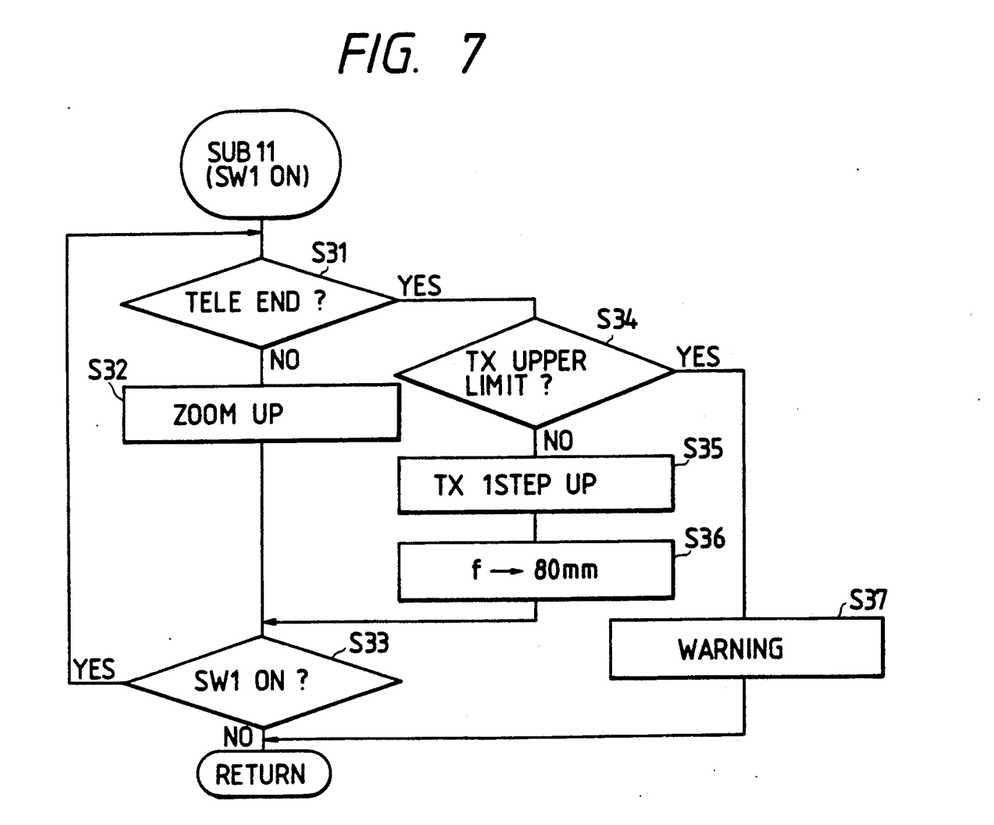

Also, if at the step S31, it is judged that the taking lens 11 is at the telephoto end, at step S34, whether the trimming magnification TX is at its upper limit, that is, whether TX=2.00, is judged. If the step S34 is negated, at step S35, the trimming magnification TX is levelled up by one step (for example, if TX=1.00 at present, TX is rendered into TX=1.26) and at the same time, the field frame 31 of the viewfinder 30 is made smaller by one step, and advance is made to step S36. At the step S36, the taking lens 11 is driven to vary the focal length f thereof to a value on the wide angle side for which is obtained the equivalent focal length fp before the trimming magnification TX is changed, and advance is made to step S33. In the present embodiment, from the value of the settable trimming magnification TX, this value on the wide angle side is 80 mm as shown in FIG. 4. Also, if the step S34 is negated, at step S37, a warning to the effect that the equivalent focal length fp cannot be levelled up any more is given, and return is made to the process of FIG. 6.

Figure 8:
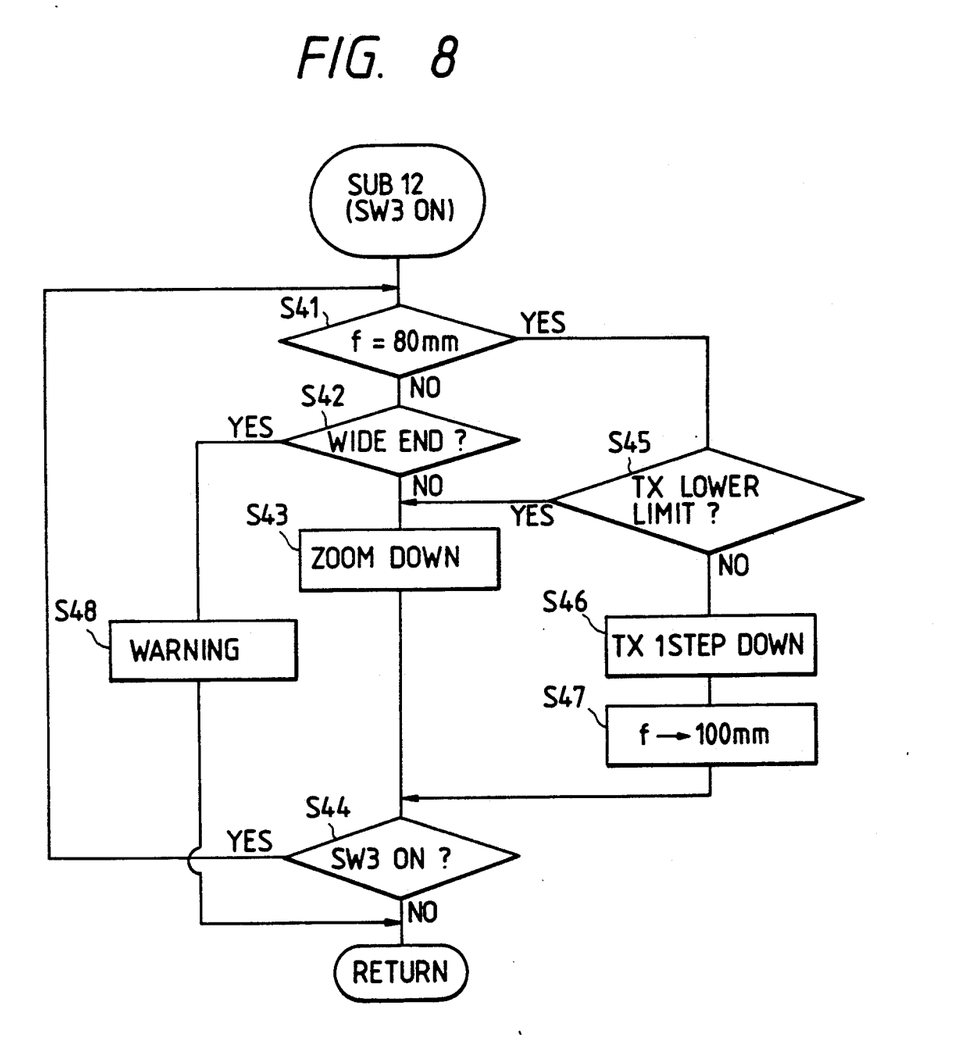

Also, if at the step S22 of FIG. 6, it is judged that the switch SW3 is ON, that is, when the switch knob 22 has been first-operated to the wide angle side, at step S40, advance is made to the subroutine SUB 12 of FIG. 8, and first at step S41, whether the focal length f is 80 mm is judged. This 80 mm is the value on the wide angle side to which the taking lens 11 is driven at the above-mentioned step S36 (FIG. 7). If the step S41 is negated, at step S42, whether the taking lens 11 is at the wide angle end, that is, whether the current focal length f is 35 mm, is judged, and if the step S42 is affirmed, at step S48, a warning to the effect that zoom down is impossible is given, and return is made to the process of FIG. 6.

If the step S42 is negated, at step S43, zoom down is effected and advance is made to step S44. That is, the taking lens 11 is driven by the motor 4 through the motor driving circuit 2 and the focal length f thereof is varied to the wide angle side. At the step S44, whether the switch SW3 is still ON is judged, and if the switch SW3 is ON, return is made to the step S41, where the above-described process is repeated, and if the switch SW3 is OFF, return is made to the process of FIG. 6.

Also, if at the step S41, it is judged that the focal length f is 80 mm, at step S45, whether the trimming magnification TX is at its lower limit value, that is, whether TX=1.00, is judged. If the step S45 is affirmed, advance is made to the above-described step S43, and if the step S45 is negated, at step S46, the trimming magnification TX is leveled down by one step (for example, if at present, TX=1.26, TX is rendered into TX=1.00) and at the same time, the field frame 31 of the viewfinder 30 is made larger by one step and advance is made to step S47. At the step S47, the taking lens 11 is driven to the telephoto end (f=100 mm), and advance is made to step S44. That is, the focal length of the taking lens is made to assume the equivalent focal length fp before the trimming magnification TX is changed.

Figure 9:
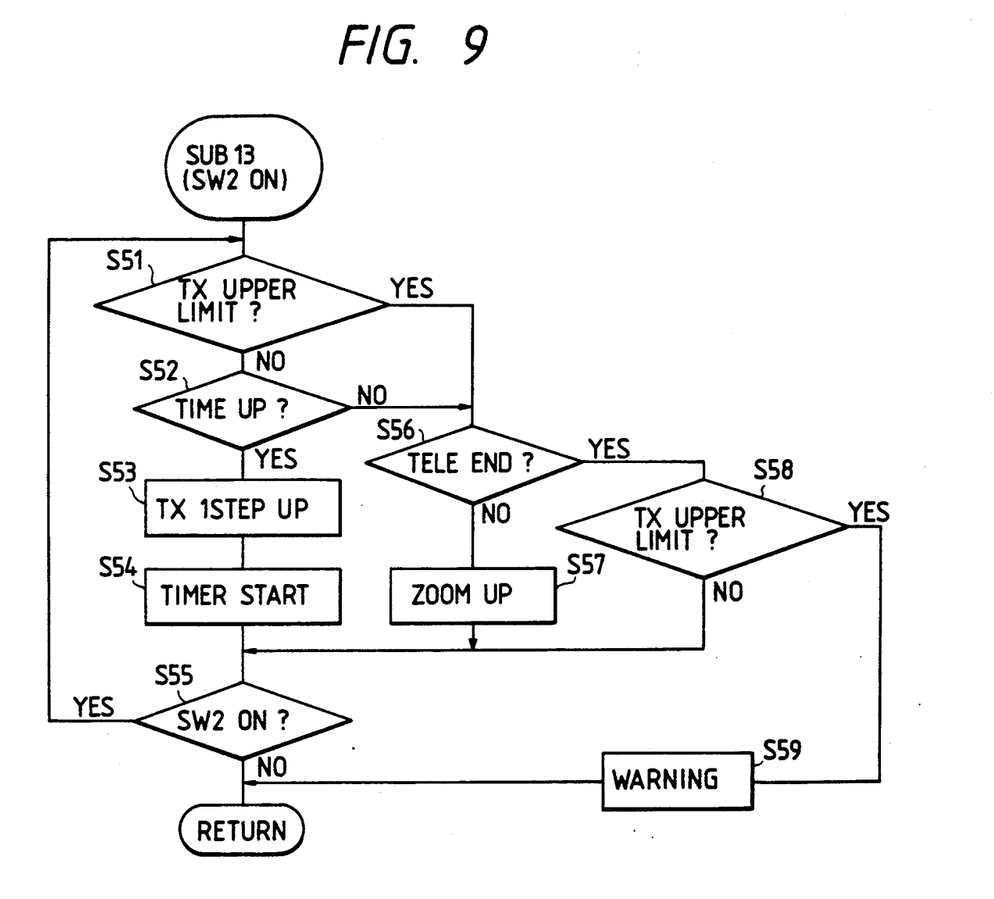

Also, if at the step S23 of FIG. 6, it is judged that the switch SW2 is ON, that is, if the switch knob 22 is second-operated to the telephoto side, at step S50, shift is made to the subroutine SUB 13 of FIG. 9. First, at step S51, whether the trimming magnification TX is at its upper limit value is judged, and if the step S51 is negated, at step S52, judgment of a timer is effected. This timer, as will be described later, starts to count time at step S54 with a change in the trimming magnification TX, and at step S52, whether the counting of a predetermined time (e.g. 0.3 second) has been completed is judged. If the step S52 is affirmed, at step S53, the trimming magnification TX is levelled up by one step and also, the field frame 31 of the viewfinder 30 is changed to one smaller by one step. Then, at step S54, the timer is started and advance is made to step S55. At the step S55, whether the switch SW2 is still ON is judged, and if the step S55 is affirmed, return is made to the step S51, and if the step S55 is negated, return is made to the process of FIG. 6.

On the other hand, if the step S51 is affirmed, or if the step S52 is negated, advance is made to step S56, where whether the taking lens 11 is at the telephoto end is judged. If the step S56 is negated, at step S57, zoom up is effected and advance is made to step S55, and if the step S56 is affirmed, at step S58, whether the trimming magnification TX is at its upper limit value is judged. If the step S58 is negated, advance is made to step S55, and if the step S58 is affirmed, at step S59, a warning to the effect that zoom up is impossible is given, and return is made to the process of FIG. 6.

Figure 10:
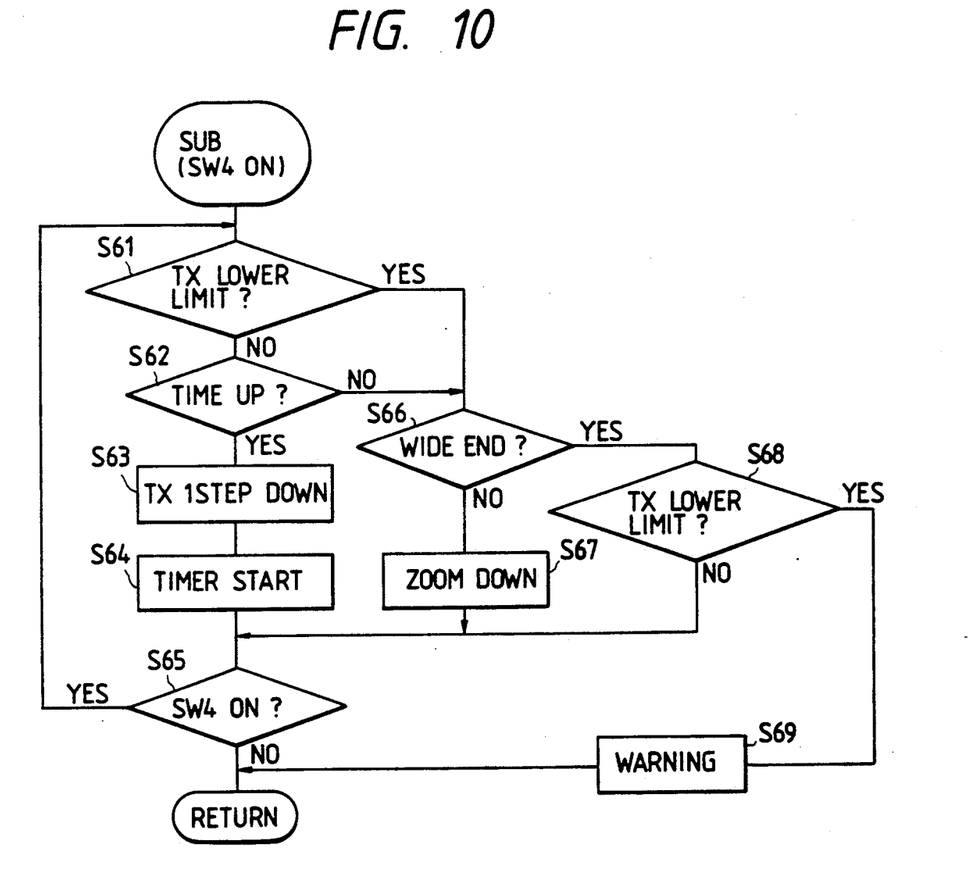

If at the step S24 of FIG. 6, it is judged that the switch SW4 is ON, that is, if the switch knob 22 is second-operated to the wide angle side, at step S60, shift is made to the subroutine SUB 14 of FIG. 10. First, at step S61, whether the trimming TX is at its lower limit value is judged, and if the step S61 is negated, at step S62, whether the counting of a predetermined time (e.g. 0.3 second) has been completed after the starting of the timer as described above is judged. If the step S62 is affirmed, at step S63, the trimming magnification TX is levelled down by one step and also, the field frame 31 of the finder 30 is changed to one larger by one step. Then, at step S64, the timer is started and advance is made to step S65. At the step S65, whether the switch SW4 is still ON is judged, and if the step S65 is affirmed, return is made to the step S61, and if the step S65 is negated, return is made to the process of FIG. 6.

On the other hand, if the step S61 is negated, advance is made to step S66, where whether the taking lens 11 is at the wide angle end is judged. If the step S66 is negated, at step S67, zoom down is effected and advance is made to step S65, and if the step S66 is affirmed, at step S68, whether the trimming magnification TX is at its lower limit value is judged. If the step S68 is negated, advance is made to step S65, and if the step S68 is affirmed, at step S69, a warning to the effect that zoom down is impossible is given, and return is made to the process of FIG. 6, whereafter return is made to the process of FIG. 5.

The above procedure will now be described more specifically.

For example, if the switch knob 22 of the zooming button 20 is first-operated to the telephoto end, that is, operated to a position in which the index mark 22a points to the mark M2, when the focal length f of the taking lens is 35 mm and the set trimming magnification TX is 1.00, the focal length f of the taking lens 11 varies to the telephoto side in accordance with the process procedure of FIG. 7, as shown in FIG. 4. When the focal length f is between 35 mm to 100 mm, the equivalent focal length fp also assumes the same value as this focal length f. When this focal length f reaches 100 mm at the telephoto end, the trimming magnification TX is levelled up from 1.00 to 1.26 and also, the taking lens 11 is driven to such a focal length f (80 mm) on the wide angle side that the equivalent focal length fp becomes 100 mm.

If the first operation on the telephoto side is continuedly performed, the zoom up of the taking lens 11 is continuedly effected (12) and the equivalent focal length fp is levelled up, and when the focal length f becomes 100 mm (the equivalent focal length fp is 126 mm), the trimming magnification TX is levelled up from 1.26 to 1.59 and also, the taking lens 11 is driven to such a focal length f (80 mm) on the wide angle side that the equivalent focal length fp becomes 126 mm. By the repetition of the above-described process, the equivalent focal length fp can be continuously varied to 35 mm-200 mm.

Also, when the switch knob 22 is first-operated to the wide angle side, the equivalent focal length fp can likewise be continuously varied to 200 mm-35 mm in accordance with the procedure of FIG. 8.

Figure 11:
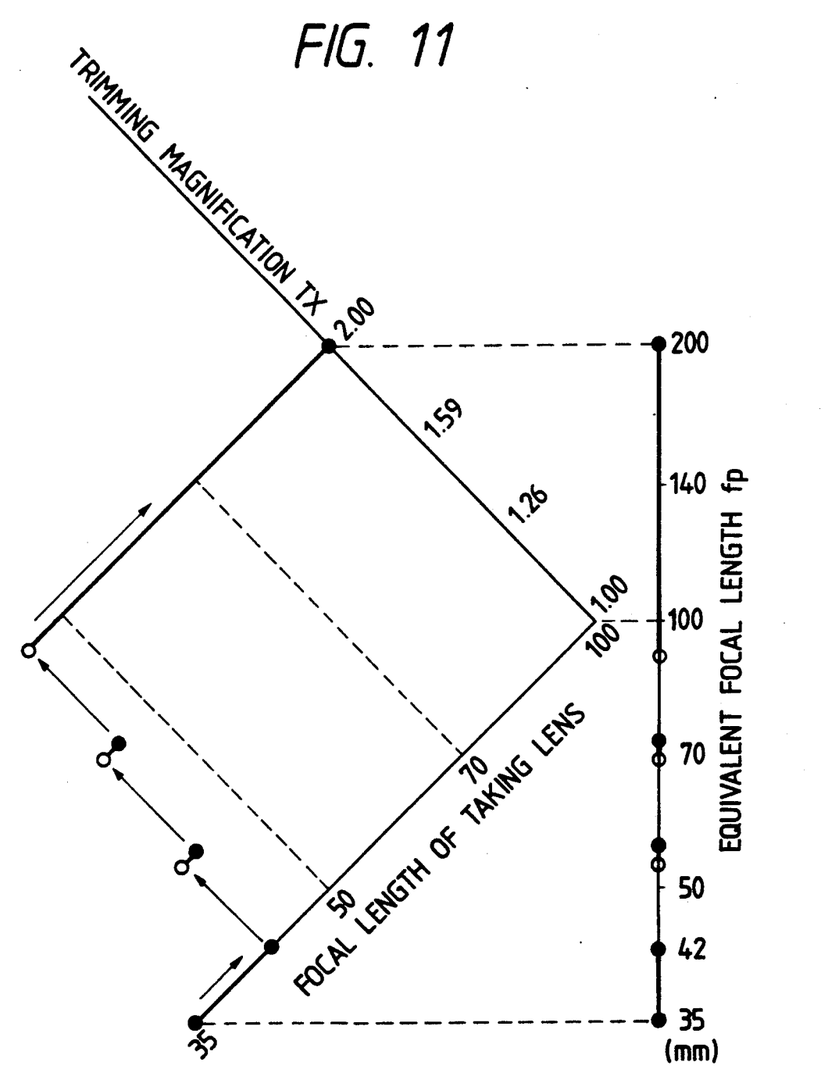

Further, if as shown in FIG. 11, the above-described first operation on the telephoto side (the switch SW1 ON) is performed when for example, the focal length f of the taking lens 11 is 35 mm and if the second operation on the telephoto side (the switch SW2 ON) is performed when the focal length f becomes e.g. about 42 mm, processing is carried out in accordance with the procedure of FIG. 9. That is, by this operation, the trimming magnification TX is levelled up from 1.00 to 1.26, and if this operation is continuedly performed, the trimming magnification TX is leveled up as 1.26→1.59→2.00 for each 0.3 second. Along therewith, the equivalent focal length fp is levelled up stepwise as shown. This is convenient, for example, for a case where the photographer encounters a shutter change and wants to effect zoom up quickly.

Furthermore, if the second operation on the wide angle side (the switch SW4 ON) is performed, for example, when the trimming magnification TX is 2.00, processing is carried out in accordance with the procedure of FIG. 10. That is, by this operation, the trimming magnification TX is levelled down from 2.00 to 1.59, and if this operation is continuedly performed, the trimming magnification TX is levelled down as 1.59→1.26→1.00 for each 0.3 second. Along therewith, the equivalent focal length fp is levelled down stepwise. This is convenient for a case where it is desired to effect zoom down quickly.

In the construction of the above-described embodiment, the motor driving circuit 2 and the zooming motor 4 together constitute driving means 101, the CPU 1 constitutes setting means 102, the recording device 3 constitutes recording means 103, and the zooming operating portion 20 constitutes operating means 104.

In the foregoing, description has been made of a camera fixedly provided with the taking lens 11 as a zoom lens, but the present invention can also be applied to a camera to which a zoom lens of this kind is removably mountable. Also, the construction of the zooming operating portion 20 is not limited to what has been described above.

Second Embodiment

A second embodiment will now be described with reference to FIGS. 12 to 14. In these figures, portions similar to those in FIG. 2 are given similar reference characters.

The first embodiment has been described with respect to a camera in which zooming is electrically effected with the operation of the switch knob 22 of the zooming operating portion 20, whereas the second embodiment is one in which the present invention is applied to a single-lens reflex camera in which zooming is manually effected.

Figure 12:
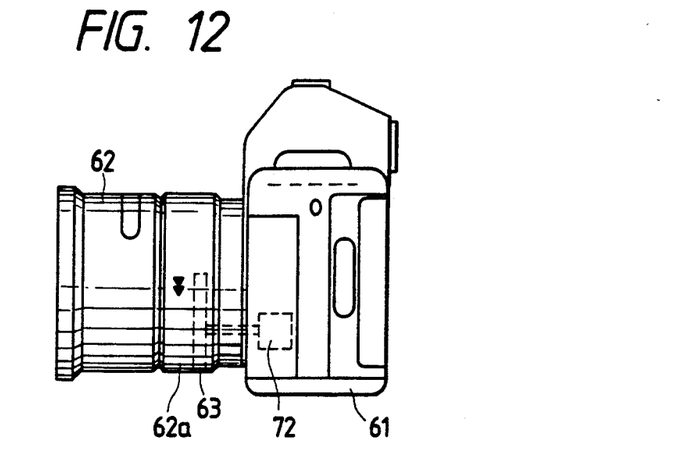
FIGS. 12 to 14 show a second embodiment of the present invention, FIG. 12 being a side view of a single-lens reflex camera, FIG. 13 being a block diagram of a control system, and FIG. 14 being a flow chart showing the process procedure.

Referring to FIG. 12 which is a side view of the camera, a taking lens (zoom lens) 62 is mountable to the camera body 61. This camera is not provided with the above-described zooming operating portion 20 and zooming motor 4, and zooming is effected by the rotative operation of the zoom ring 62a of the taking lens 62. Within the taking lens 62, there is provided an encoder 63 for outputting a number of pulse signals conforming to the amount of variation in the focal length of the taking lens, and these pulse signals are successively output to the camera body side.

Figure 13:
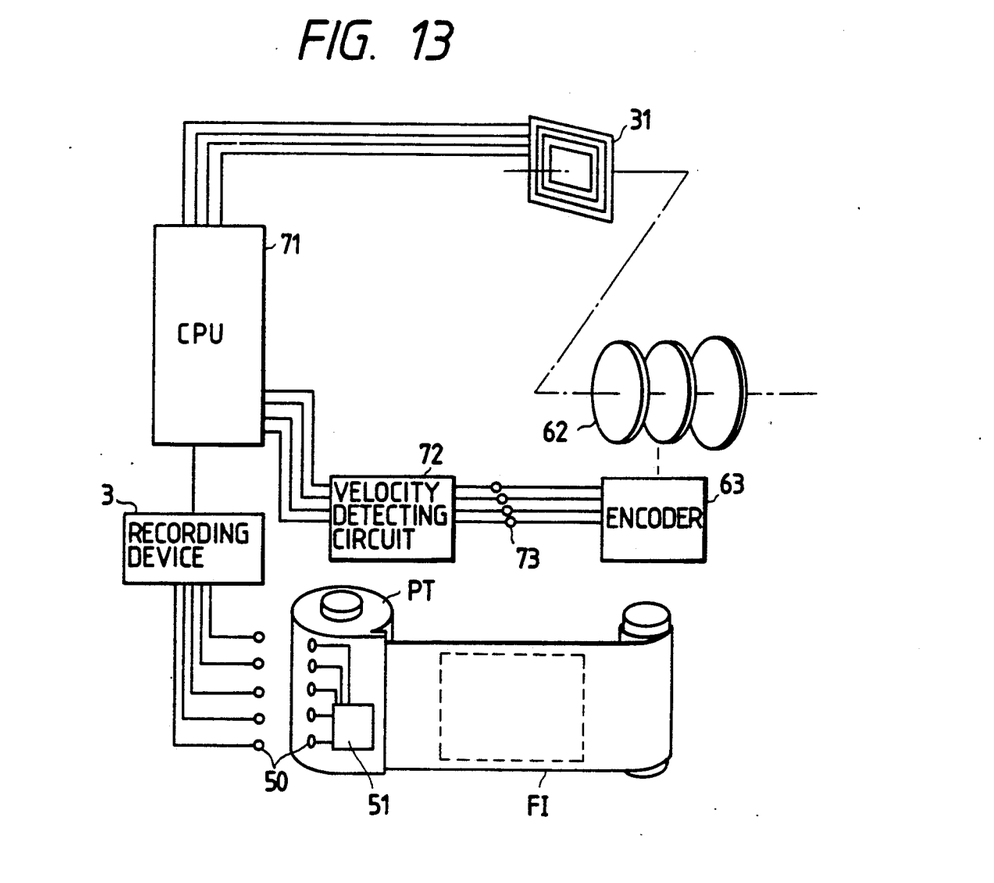

That is, as shown in FIG. 13, a velocity detecting circuit 72 is connected to a CPU 71 on the camera body 61 side, and when the taking lens 62 is mounted to the camera body 61, the velocity detecting circuit 72 and the encoder 63 within the taking lens 62 are connected together through a contact 73. The velocity detecting circuit 72 counts the number of the pulse signals input from the encoder 63 for a predetermined time, and inputs the count value to the CPU 71. This count value corresponds to the velocity of operation of the zooming ring 62a, and when this count value becomes a reference value or greater, the CPU 71 judges that the velocity of operation of the zooming ring 62a is above a predetermined value. Also, by the output from the encoder 63, the velocity detecting circuit 72 detects the direction of rotation of the zoom ring 26a as well and inputs it to the CPU 71.

Further, the viewfinder is of a construction in which an object is observed through the taking lens 62 and therefore, it is not provided with the above-described viewfinder optical system 32, and a picture plane conforming to the focal length f of the taking lens 62 is obtained by the zooming of the taking lens 62.

In the present embodiment, it is to be understood that the zooming range of the taking lens 62 and the value of and the settable trimming magnification TX are similar to those in the first embodiment.

The procedure of the control by the CPU 71 will now be described with reference to the flow-chart of FIG. 14.

Figure 14:
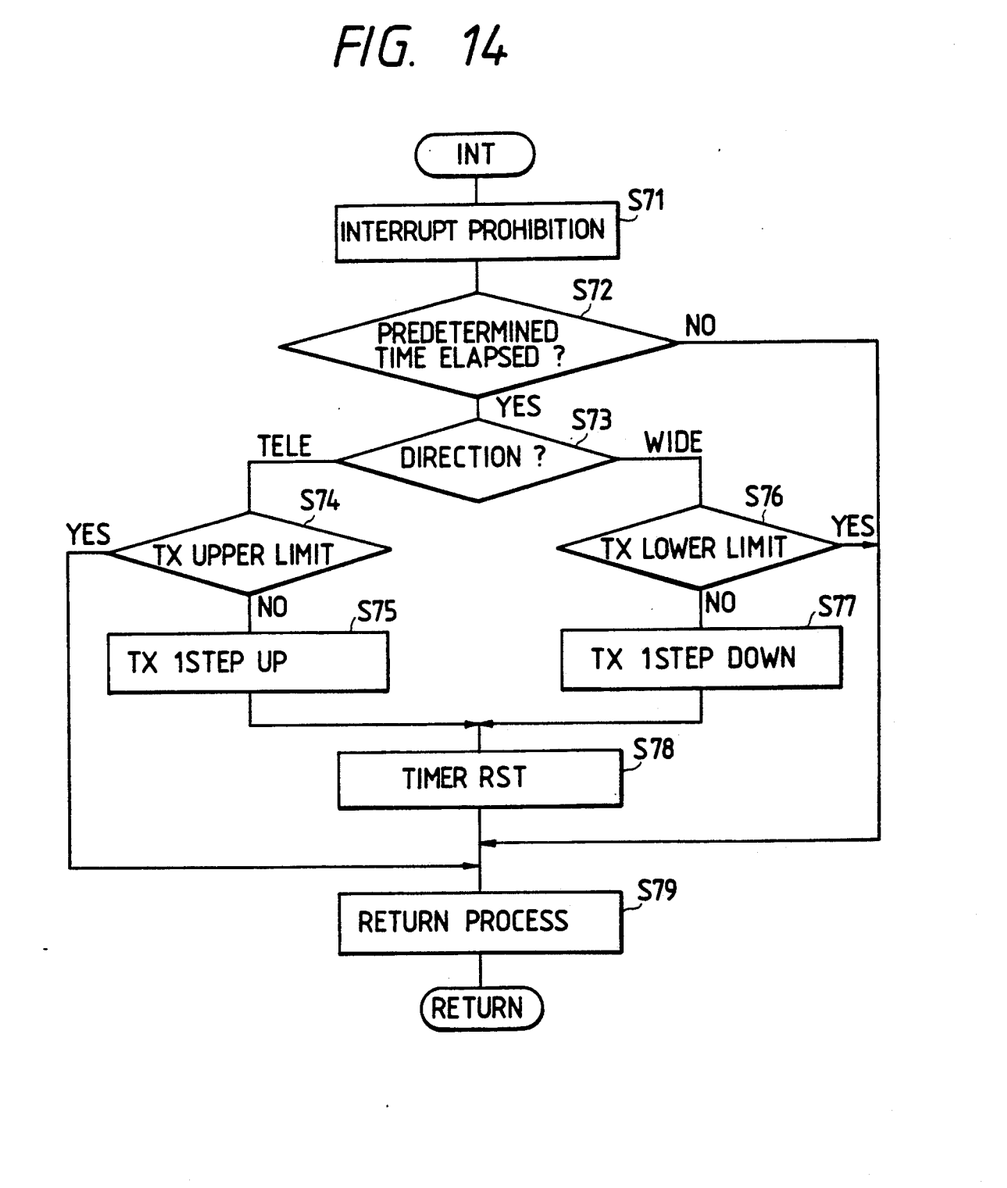

When the above-mentioned velocity of rotative operation exceeds a predetermined value, the program of FIG. 14 is interrupt-started, and first at step S71, the process of prohibiting the interrupt of this kind is carried out, and then at step S72, whether a predetermined time (0.3 second) has elapsed from after the last change in the trimming magnification TX is judged. If the step S72 is negated, at step S79, the return process is carried out and return is made to the ordinary process, and if the step S72 is affirmed, advance is made to step S73.

At the step S73, toward which of the telephoto side and the wide angle side the zoom ring 62a has been operated is judged, and if the zoom ring 62a has been operated toward the telephoto side, at step S74, whether the trimming magnification TX is at its upper limit value is judged. If the step S74 is affirmed, advance is made to step S79, and if the step S74 is negated, at step S75, a signal for changing magnification is output and the trimming magnification TX is levelled up by one step, and advance is made to step S78. On the other hand, if at the step S73, it is judged that the zoom ring 62a has been operated toward the wide angle side, at step S76, whether the trimming magnification TX is at its lower limit value is judged. If the step S76 is affirmed, advance is made to step S79, and if the step S76 is negated, at step S77, a signal for changing magnification is output and the trimming magnification TX is levelled down by one step, and advance is made to step S78. At the step S78, the timer is started and advance is made to step S79.

According to what has been described above, when the zoom ring 62a is rotatively operated at a velocity below a predetermined value, ordinary zoom up or zoom down is effected depending on the direction of that operation, and when the zoom ring 62a is rotatively operated at a velocity exceeding the predetermined value, the trimming magnification is levelled up or down depending on the direction of that operation. Accordingly, for example, when a shutter chance is encountered, the zoom ring 62a is rotatively operated at a velocity higher than the predetermined value, whereby a desired equivalent focal length fp can be obtained quickly.

In the construction of the above-described embodiment, the zoom ring 62a constitutes an operating member 201, and the CPU 71 constitutes deciding means 202 and control means 203.

In the above-described embodiment, design is made such that form the output of the encoder 63 on the taking lens 62 side, the rotational velocity of the zoom ring 62a is detected by the velocity detecting device 73 on the camera body 62 side, but alternatively, the velocity detecting device 73 may be provided on the taking lens 62 side. Also, description has been made of a single-lens reflex camera to which the taking lens 62 as a zoom lens is removably mountable, but the present invention can also be applied to a camera fixedly provided with a zoom lens having a zoom ring 62a of this kind. Further, although zooming is accomplished by rotatively operating the zoom ring 62a, zooming is not limited to the rotative operation.

Also, in the first and second embodiments, the zooming range of the zoom lens and the settable trimming magnification are not limited to the above-mentioned values.

According to the invention of appended claim 1, in a camera wherein zooming is electrically effected, there is provided an operating member capable of performing a first operation and a second operation subsequent to and in the same direction as said first operation, and design is made such that ordinary zooming is effected with the first operation and a change in the trimming magnification is done with the second operation and therefore, zooming and a change in the trimming magnification can be accomplished by a single operating member, and the operability is improved.

Also, according to the invention of appended claim 2, in a camera wherein zooming is manually effected, design is made such that when the zooming operating member is operated at a predetermined velocity or higher, the trimming magnification is changed and therefore, as described above, zooming and a change in the trimming magnification can be accomplished by a single operating member, and the operability is improved.

We claim:

1. A camera capable of trimming photographing, comprising:
   driving means for electrically driving a zoom lens on the basis of a received signal for zooming and varying the focal length thereof;
   setting means for setting one of a plurality of presettable trimming magnifications on the basis of a received signal for changing magnification;
   recording means for recording information regarding said set trimming magnification on a recording medium; and
   operating means capable of performing a first operation and a second operation subsequent to and in the same direction as said first operation, and producing said signal for zooming in response to said first operation and said signal for changing magnification in response to said second operation.

2. A camera capable of trimming photographing, comprising:
   setting means for setting one of a plurality of presettable trimming magnifications on the basis of a received signal for changing magnification;
   recording means for recording information regarding said set trimming magnification on a recording medium;
   an operating member for changing the focal length of a zoom lens in conformity with the amount of operation;
   deciding means for receiving a signal conforming to the velocity of operation of said operating member and judging on the basis of said signal whether said velocity of operation is above a predetermined value; and
   controlling means for outputting said signal for changing magnification to said setting means and changing the trimming magnification set in said setting means when it is judged by said deciding means that said velocity of operation is above said predetermined value.

3. A camera capable of trimming photographing, comprising:
   driving means for electrically driving a zoom lens on the basis of a received signal for zooming and varying the focal length thereof;
   setting means for setting a trimming magnification on the basis of a received signal for changing magnification;
   recording means for recording information regarding said set trimming magnification on a recording medium; and
   operating means capable of performing a first operation and a second operation subsequent to and in the same direction as said first operation, and producing said signal for zooming in response to said first operation and said signal for changing magnification in response to said second operation.

4. A camera capable of trimming photographing, comprising:

setting means for setting a trimming magnification on the basis of a received signal for changing magnification;

recording means for recording information regarding said set trimming magnification on a recording medium;

an operating member for changing the focal length of a zoom lens in conformity with the amount of operation;

deciding means for receiving a signal conforming to the velocity of operation of said operating member and judging on the basis of said signal whether said velocity of operation is above a predetermined value; and controlling means for outputting said signal for changing magnification to said setting means and causing said setting means to set the trimming magnification when it is judged by said deciding means that said velocity of operation is above said predetermined value.

5. A camera capable of trimming photographing, comprising:

driving means for electrically driving a zoom lens on the basis of a received signal for zooming and varying the focal length thereof;

setting means for setting a trimming magnification on the basis of a received signal for changing magnification;

recording means for recording information regarding said set trimming magnification on a recording medium; and operating means capable of performing a first operation and a second operation, and producing said signal for zooming in response to said first operation and producing, regardless of the position of said zoom lens, said signal for changing magnification in response to said second operation.

6. A camera capable of trimming photographing, comprising:

driving means for electrically driving a zoom lens on the basis of a received signal for zooming and varying the focal length thereof;

setting means for setting a trimming magnification on the basis of a received signal for changing magnification;

recording means for recording information regarding said set trimming magnification on a recording medium;

first operation means responsive to a manual operation for producing said signal for zooming; and second operation means responsive to a manual operation for producing said signal for changing magnification regardless of the position of said zoom lens, and for inhibiting said driving means from driving said zoom lens.

* * * * *